(12) United States Patent
Shani et al.

(10) Patent No.: US 8,019,707 B2
(45) Date of Patent: Sep. 13, 2011

(54) INTERACTIVE HYBRID RECOMMENDER SYSTEM

(75) Inventors: Gai Shani, Kibutz Beit Kama (IL); Lior Rokach, Omer (IL); Amnon Meisels, Omer (IL); Nischal Piratla, Berlin (DE)

(73) Assignee: Deutsche Telekom AG, Bonn (DE)

( * ) Notice: Subject to any disclaimer, the term of this patent is extended or adjusted under 35 U.S.C. 154(b) by 939 days.

(21) Appl. No.: 11/903,094

(22) Filed: Sep. 20, 2007

(65) Prior Publication Data

US 2009/0164442 A1   Jun. 25, 2009

(51) Int. Cl.
G06F 17/00 (2006.01)
G06N 5/00 (2006.01)
(52) U.S. Cl. .......................................... 706/45
(58) Field of Classification Search ............ 706/46, 706/45

See application file for complete search history.

(56) References Cited

U.S. PATENT DOCUMENTS

2006/0156326 A1   7/2006 Goronzy et al.

FOREIGN PATENT DOCUMENTS

EP   1395056   3/2004

OTHER PUBLICATIONS

M. Balabanovic and Y. Shoham, "Fab: Content-Based, Collaborative Recommendation", Comm. of the ACM, vol. 40, No. 2, pp. 66-72 (Mar. 1997).*

Micarelli, Alessandro et al: "Anatomy and Empirical . . . System", Kluwer Academic Pub, vol. 14, No. 2-3, Jun. 1, 2004, pp. 159-200, XP019269989.
Orwant, J.: "Heterogeneous learning in . . . system" User Modeling and User-adapted Interaction, Netherlands, vol. 4, No, 2, 1994, pp. 107-130; XP002463020.
P. Resnick and H. R. Varian, Recommender systems, Communications of the ACM, 40(3):56-58, 1997.
M. Montaner, B. Lpez, and J. L. De La Rosa, A taxonomy of recommender agents on the Internet. Artificial Intelligence Review, 19:285-330, 2003.
J. S. Breese et al., "Empirical analysis of predictive algorithms for collaborative filtering", Uncertainty in Artificial Intelligence, 1998, pp. 43-52.
Teixeira et al., "A method for speeding up user preferences acquisition in collaborative filtering systems", SBIA Conference, pp. 237-247, 2002.
E. Rich, User modeling via stereotypes, Cognitive Science, vol. 3, pp. 329-342, 1998.
Orwant, User Model. User-Adapt.Interact., 4(2):107-130, 1995.
I. Schwab, "How to learn more about users from implicit observations", UM 2001 Conference Proceedings, pp. 286-288, 2001.

(Continued)

*Primary Examiner* — Jeffrey A Gaffin
*Assistant Examiner* — Vincent M Gonzales
(74) *Attorney, Agent, or Firm* — Roach Brown McCarthy & Gruber, P.C.; Kevin D. McCarthy

(57) ABSTRACT

A hybrid recommender system, in which the initial stereotype is manually defined by an expert and an affinity vector of stereotypes relating to each specific user who registers onto the system, is created to define a specific profile for each user. Recommendations for a specific user are generated according to the initial stereotype and the affinity vector of stereotypes. A binary feedback, from user regarding specific items picked by him is received (e.g., while of the item), which can be either positive or negative. Then the affinity vector of stereotypes is updated.

18 Claims, 2 Drawing Sheets

OTHER PUBLICATIONS

R. Burke, "Hybrid recommender systems: Survey and experiments", User Modeling and User-Adapted Interaction, 12(4):331-370, 2002.

Hagen et al., EUNITE03, Oulu, Finland, 2003.

J. C. Bezdek, "Pattern Recognition with Fuzzy Objective Function Algorithms", New York, 1981.

J. F. Kolen and T. Hutcheson, "Reducing the time complexity of the fuzzy C-Means algorithm", IEEE Transactions on Fuzzy Systems 10(2)263-267, 2002.

* cited by examiner

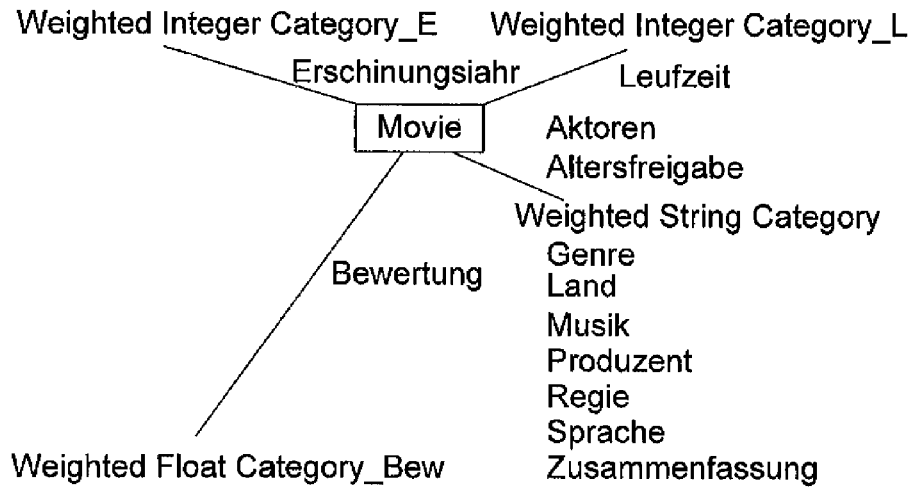

Template Slots

| | Slot Name | Documentation | Type |
|---|---|---|---|
| ■ | Aktogen | Cast overview, Darsteller | Weigted String Category |
| ■ | Altersfreigabe | Cetrification, FSK, MPAA Rating | Weigted String Category |
| ■ | Autor | Written by | Weigted String Category |
| ■ | Bewertung | User Rating, Rezensionen (Bewertung), AMG Rating, Durchschnittliche Kundenbewertung | Weigted Float Category_Bew |
| ■ | Erscheinungsjahr | Release, Erscheinungstermin | Weigted Integer Category_E |
| ■ | Genre | The Genre | Weigted String Category |
| ■ | Laufzeit | Runtime in minutes | Weigted Integer Category_L |
| ■ | Musik | Musik | Weigted String Category |
| ■ | Produzent | Produced by | Weigted String Category |
| ■ | Regie | Director, Regie | Weigted String Category |
| ■ | Sprache | Language, Sprachen | Weigted String Category |
| ■ | Zusammenfassung | Plot Outline, Plot Synopsis, Preview | Weigted String Category |

Fig. 1

INTERACTIVE HYBRID RECOMMENDER SYSTEM

FIELD OF THE INVENTION

The present invention relates to the field of recommender systems. Specifically, this invention relates to a recommender system which is designed to be a hybrid of the collaborative filtering and content based techniques.

BACKGROUND OF THE INVENTION

With the escalating amount of data available online, recommender systems [P. Resnick and H. R. Varian, Recommender systems, *Communications of the ACM*, 40(3):56-58, 1997] became very popular, especially on web sites. As known in the art, recommender systems are systems that recommend items to users. Such systems have various applications such as helping users find web pages that interest them, recommending products to customers in e-commerce websites, recommending TV programs to users of interactive TV and displaying personalized advertisements. While there are many types of recommender systems ranging from manually predefined un-personalized recommendations to fully automatic general purpose recommendation engines, two dominating approaches have emerged—Collaborative Filtering (CF) and Content Based (CB) recommendations.

Both CF and CB are discussed by Montaner et al. [M. Montaner, B. Lpez, and J. L. De La Rosa. A taxonomy of recommender agents on the internet. *Artificial Intelligence Review*, 19:285-330, 2003]. In summary, the CF approach considers the recommended items only by a unique identifier and recommends items that were purchased together, while ignoring any attribute of the item. On the other hand, CB recommendations are generated based on an item profile (i.e., a set of attributes of an item) discarding purchase information.

Collaborative filtering stems from the assumption that people looking for recommendations often ask for the advice of friends. Since on the internet the population that can supply advice is very large, the part of the population which may be relevant for the current user must be identified.

CF methods identify similarity between users based on items they have rated, and recommend new items similar users have liked. CF processes vary by the method they use to identify similar users. Originally Nearest-Neighbor approaches, based on the Pearson Correlation, computing similarity between users directly over the database of user-item ratings were implemented. However, most modern systems avoid querying the database (of either user-item ratings or item or item descriptions) directly. Instead statistical models (e.g. Decision Tree, SVD matrix, Dependency Network) are adopted to allow scaling up to millions of users and items. Model-based approaches usually sacrifice some accuracy in favor of a rapid recommendation generation process [J. S. Breese et al., "Empirical analysis of predictive algorithms for collaborative filtering", Uncertainty in Artificial Intelligence, 1998, pages 43-52]. Such an approach is better scaled to modern applications.

CF is advantageous in that it is independent of the specification of the item and can therefore provide recommendations for complex items which are very different, yet are often used together. On the other hand, one major drawback of this approach is the inability to create good recommendations for new users that have not yet rated many items, and for new items that were not rated by many users (this problem is known in the art as the "cold-start" problem).

As mentioned above, CB recommendations relate to the attributes of the items. The CB approach originates in the field of information filtering, where documents are searched according to some given analysis of their text. Items are hence defined by a set of features or attributes. Such systems define a user using preferences over this set of features, and obtain recommendations by matching between user profiles and item profiles looking for best matches. It should be understood that although in the art methods that learn preferred attributes from rated items (referred to as content-based) are sometimes separated from methods that ask the user to specify his preferences over item attributes (referred to as demographic filtering), herein, all methods that base their recommendations on item attribute preferences are related to as content-based recommendations.

CB systems can easily provide valid recommendations to new users, assuming that their profile is specified, even if they never used the system before. CB engines can provide recommendations for new items that were never rated before based on the item description and are therefore very useful in environments where new items are constantly added.

However, Content-based approaches rarely implement statistical models and usually match user profiles and item profiles directly. User and item profiles are very sensitive to profile definitions, i.e., which attributes are relevant and which attributes should be ignored. It is also difficult to create an initial profile of the user, by specifying the interests and preferences of that specific user. Users are usually reluctant to provide thorough description of the things they like and do not like. In some cases users are unaware of their preferences. For example, a user cannot know whether he likes an actor he did not see. In fact, the acquisition of user preferences is usually considered to be a bottleneck for practical use of these systems [Teixeira et al., "A method for speeding up user preferences acquisition in collaborative filtering systems", SBIA Conference, pages 237-247, 2002].

A term used both in CF and CB methods is "stereotypes", known also as "communities". Stereotypes are a way to define an abstract user that has general properties similar to a set (community) of real users. As known to those familiar with the art, modeling users by stereotypes (or communities) is a well studied concept [E. Rich, User modeling via stereotypes, Cognitive Science, vol. 3, pages 329-342, 1998].

In CF systems stereotypes are described by a set of ratings over items, and user similarity can be identified by their affinity to various stereotypes. In CB systems, a stereotype is a set of preferences over item attributes, and users can belong to a single stereotype [E. Rich, User modeling via stereotypes, Cognitive Science, vol. 3, pages 329-342, 1998] or to multiple stereotypes [Orwant, *User Model. User-Adapt. Interact.*, 4(2):107-130, 1995]. Recommendations are computed based on the stereotype and then normalized according to the user affinity to a stereotype.

Generally, in order to adapt and refine recommendations to changes in user tastes, most recommender systems, including CB and CF, rely on feedback from users. Feedback is usually in the form of a rating over an item that can be either numeric (on a scale of, e.g., 1 to 5) or binary (like/dislike).

As users are usually reluctant to rate items explicitly, some research has been focused on obtaining implicit ratings (e.g. [R. Schwab, "How to learn more about users from implicit observations", UM 2001 Conference Proceedings, pages 286-288, 2001]), i.e., estimating the user ratings through his observable operations. For example, in web browsing, if the user scrolled down the article, or clicked on a link inside the article, then it can be assumed that the article was useful for him. If the user, however, only read the title and then went back to the former page, it can be assumed that the web page was not useful for him.

As mentioned above, although both CF and CB systems have several advantages, they suffer from drawbacks, as well. Furthermore, a more detailed study of both systems reveals that they are complementary to each other in many aspects. Therefore, there have been attempts to provide better recommendation systems, based on a combination of both approaches [R. Burke, "Hybrid recommender systems: Survey and experiments", *User Modeling and User-Adapted Interaction,* 12(4):331-370, 2002].

Many hybrid approaches use two recommendation processes and combine their results in some manner, such as combining the results by their relevance, mixing the output of the two processes, switching from CB into CF once the cold-start phase is over, or using the output of one process as an input to the second process. However, such ad-hoc combinations are not optimal in their performance.

It would therefore be highly desirable to provide a recommendation system that overcomes the drawbacks of the existing systems. Such a system would be, at its nature a hybrid of CF and CB, rather than ad-hoc combination of the two.

It is the object of the present invention to provide a recommendation system that is, at its core, a hybrid of CF and CB.

It is a further object of the present invention to provide a recommendation system that implements a set of stereotype content-based profiles using an affinity vector of stereotypes as the user profile.

It is yet a further object of the present invention to provide a recommendation system that can be updated in regard to any new, relevant, data concerning the user.

Additional purposes and advantages of this invention will become apparent as the description proceeds.

SUMMARY OF THE INVENTION

The present invention is related to a hybrid recommender system, in which the initial stereotype is manually defined by an expert and an affinity vector of stereotypes relating to each specific user who registers onto the system is created to define a specific profile for each user. Recommendations for a specific user are generated according to the initial stereotype and the affinity vector of stereotypes. Feedback, e.g., a binary feedback, from user regarding specific items picked by him is received (e.g., during her use of the item), which can be either positive or negative. Then the affinity vector of stereotypes is updated.

The affinity vector of stereotypes for each user may be created according to his response to a set of questions, where each question compares several representative items, and a form (which may be learned by a tree induction process thereby creating a new decision tree for each new user), based on a decision tree and specifying the user's interests. The user may answer between none and all of the questions appearing on the form, which may be partially filled out according to information available to the system from sources other than the user. The form may be based on a decision tree.

The recommendations for a specific user may be generated using a matching engine that computes the relevance of each item (i) to the user (u) with affinity vector (v) according to $$\text{relevance}(i, u) = \sum_{s \in \text{stereotypes}} v(s) \, \text{relevance}(i, s),$$

wherein relevance(i,s) is the relevance of item (i) to stereotype (s).

The recommendation comprises items with unexpected context to the user chosen according to an $\epsilon$-greedy technique and/or by randomly boosting the relevance of a random stereotype. The feedback preferably uses explicit ratings, implicit ratings or both implicit and explicit ratings. The feedback may be automatically registered by the system according to the user's reaction to the recommended items.

The affinity vectors may be updated by a computationally light process, a computationally heavy process, or both the processes. The computationally light process comprises the steps of:
  updating the affinity vector according to feedback received from the user;
  recomputing the recommendation list of item to incorporate new items added into the database, wherein a new relevance value for each new item is computed according to the equation of for calculating relevance(i, u) hereinabove and wherein the new relevance values are merged into the existing recommendation list; and
  reconstructing the stereotypes automatically ignoring the affinity vectors of stereotypes using a clustering process according to at least one of the following measures:
  the user feedback;
  new items offered;
  new trends among users; and
  revised ontology representation for items.

The number of clusters may be either predefined or automatically induced by using fuzzy C-Means clustering process. The heavy updating process comprises the steps of:
automatically constructing a user representation profile that comprises a list of preferred values for each possible attribute by observing the list of items rated positively;
creating clusters of similar users by way of a clustering process (such as soft-clustering) using a distance metric over the similarity of the user representation profile;
creating a stereotype profile wherein the users are weighted according to the distance metric; and
reconstructing an affinity vector for each user according to the stereotype profile.

Manually defined initial stereotypes are preferably maintained and used to define new users.

All the above and other characteristics and advantages of the invention will be further understood through the following illustrative and non-limitative description of preferred embodiments thereof.

BRIEF DESCRIPTION OF DRAWINGS

FIG. 1 is an example of a model stereotype which is part of the ontology for movies.

DETAILED DESCRIPTION OF PREFERRED EMBODIMENTS

Figure 2:
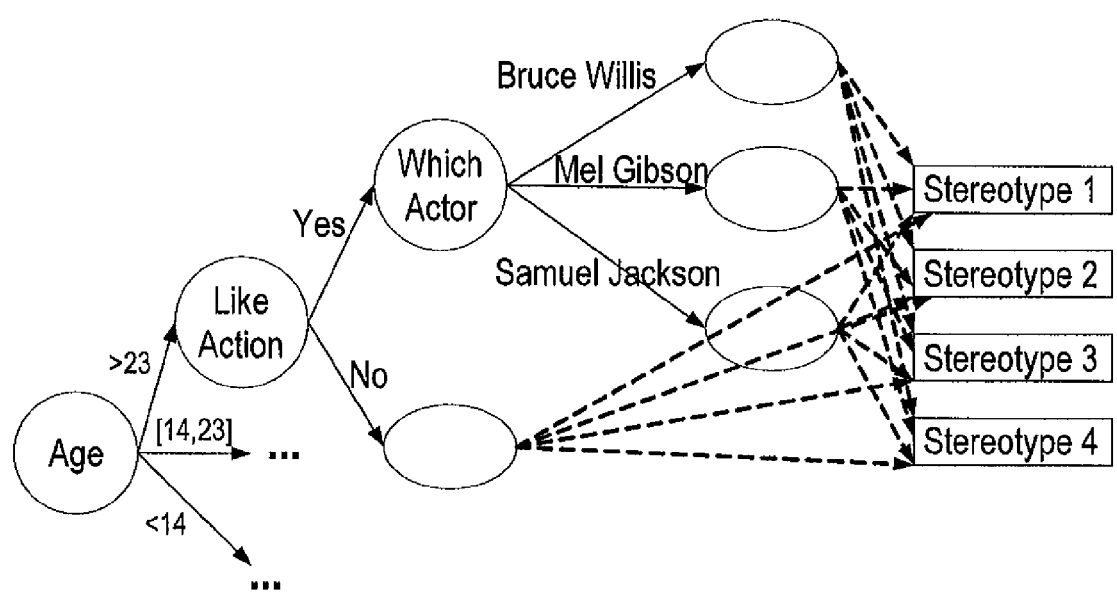
FIG. 2 illustrates a possible decision tree of questions which can be used on the form of the present invention.

The recommendation system proposed by the present invention is capable of recommending items to users of any appropriate electronic device, such as mobile computers, PDAs, and cellular phones. The system can further be modeled to recommend practically any type of data, e.g., media, music, books, etc. As a matter of convenience only, reference herein is made mainly to the recommendation of media data over cellular phones. This is not intended to limit the invention in any manner.

The system of the present invention is designed to allow mobile, portal or sling box users to obtain contents which is the most appropriate for them. As an example, in one embodiment of the present invention, the system provides an entertain me option for a user (e.g., waiting for a bus), which when selected, delivers contents that fit the user's personal preferences through his mobile phone.

The system of the present invention uses a stereotype approach while combining elements from both CB and CF approaches. A stereotype model, which is set up according to a CB approach, is used, thereby defining ontology over media items (see FIG. 1, for example).

According to the present invention, the initial stereotypes are manually defined by an expert. An expert in the field of movies, for example, is able to identify several types of movie watchers, such as people who like action movies and people who prefer Science-Fiction. Identifying the relevant actors, directors and other attributes of these stereotypes is also done by the expert.

When a new user registers into the system, an affinity vector of stereotypes relating specifically to that user is created. Prior research in the field has mainly focused on using either a set of examples relevant to the user (e.g. a number of movies the user likes) or a form specifying the user interests (an example of using such a form can be found in "E. Rich, User modeling via stereotypes, pages 329-342, 1998"). Such approaches are problematic, since while rating observed movies is a painless process, using only a set of rated movies can cause the system to later recommend only movies similar to the ones the user rated. Furthermore, the filling out of lengthy forms is usually considered a boring chore by most users, therefore they tend to either avoid filling out the forms altogether, or answer questions arbitrarily (e.g. always selecting the first answer).

The present invention combines the two approaches referred to hereinabove, i.e., a set of examples and a form. A set of simple questions is presented to every user, such as whether he likes an actor, selecting a favored movie out of a set of 3 movies or answering demographic questions, such as age or occupation. Though it is well-known that users do not like to provide information about themselves, in many instances such information is likely to be available to the system, e.g., when the recommendations are provided via the cellular phone service. Furthermore, according to one embodiment of the present invention, the user may answer as many questions as she likes, and the system exploits the amount of information provided, even if it is not full.

The approach proposed by the present invention is based on a decision tree, with questions at the decision nodes. Each node, including those considered as leaves as well as the inner nodes, is also assigned an affinity vector of stereotypes, so if the user does not wish to answer more questions, the current affinity vector will be assigned to that node. The more questions the user answers the more specific its affinity vector becomes, but even without answering any question there can still be some affinity vector under the assumption, for example, that most of the users of such systems tend to be teenagers. FIG. 2 illustrates a possible decision tree of questions.

Once the system obtains a user profile definition in the form of an affinity vector, recommendations are generated for this user, based on the relevant stereotypes.

First, the recommendations for the stereotypes are computed. As a stereotype describes a content-based profile, explicitly stating preferences over the possible values of item attributes, a matching engine that computes the relevance of a media item to a stereotype is activated. As the number of stereotypes is not expected to be too high, these lists can be persistent in the database. Moreover, it is expected that many items will have low relevance to stereotypes, so the lists can be truncated after exceeding a predefined threshold.

Once a request for a recommendation for user u with affinity vector v is received, the relevance of media item i to user u is computed as follows:

$$\text{relevance }(i, u) = \sum_{s \in stereotypes} v(s) \text{ relevance }(i, s) \qquad (1)$$

wherein relevance(i,s) is the persisted relevance of item i to stereotype s. This process is much faster than matching between each user and all items in the database, using a matching engine.

In one embodiment of the present invention, it is desirable to surprise the user sometimes with unexpected content. It is useful to try and explore the user's preferences by presenting new media contents that the user is unaware of, since many users cannot accurately define what they like (e.g. [ten Hagen et al., EUNITE03, Oulu, Finland, 2003]). Presenting a list of 5 recommendations to the user enables a high level of acceptance and explore to be maintained by always fixing the first 3 recommendations to the most likely items, as predicted by Equation 1, and exploring over the last 2 items only. Exploration is done over two different axes. The first one implements an $\epsilon$-greedy exploration selecting items that have lower relevance, given the relevance list. Further exploration is performed by randomly boosting the relevance of a random stereotype in the relevance equation.

The system proposed by the present invention supports both positive and negative feedbacks. Since most users find it easier to specify binary (i.e., like/dislike) feedbacks rather than numeric values, binary feedback is preferably used. However, the system can be easily adapted for numeric feedbacks, as well.

Two different types of feedbacks, i.e., explicit and implicit ratings, can be used according to the present invention. The present invention relates to the use of either type of feedback, or, preferably, both.

According to one embodiment of the present invention, while the user is watching a media item he can select whether he likes or dislikes it. When a list of 5 items is presented to a user and he selects the 3rd item, it is assumed that he did not like the first two items, and the system is notified of a negative response for the first two items.

The media content domain in one embodiment of the present invention, uses streaming technology to show media content to users. The server is therefore aware whether the user watched the item fully or decided to stop after a few seconds. If the user decided to stop watching after a few seconds, it is assumed that he did not like the media item and the system is notified of a negative rating.

In most environments the relevant items list (i.e., the affinity vector), for a specific user needs to be updated so often due to the insertion of new items, changes in the information relating to the user (through feedback, for example) and general new trends of user preferences.

According to the present invention, two types of updates can be implemented, the first is computationally light, while the second is computationally heavy.

The first, computationally light, update comprises three update phases designed to refine the stereotype model proposed by the present invention: Affinity vector update: When a feedback from a user (either positive or negative) is received, the affinity vector is updated accordingly. The rated item is searched for in the relevance lists of the stereotypes. If an item rated positively is relevant to a stereotype, the relevance of the stereotype is boosted in relevance to the specific user. If an item was rated negatively by the user, the relevance of stereotypes that recommended it to the user are lowered. A decaying learning factor λ is used, so that the user affinity vector will eventually converge. λ is reset once the stereotype model is rebuilt.

Recommendation lists re-computation: in light of the addition of new items into the database, it is required to re-compute the persisted recommendation lists of the stereotypes. The new relevance values for new items are computed, and merged into the persisted lists of recommendations. As it is sometimes preferable to recommend new items to the user, in one embodiment of the present invention, the relevance of items currently in the lists is decreased by a constant factor. This decrease is known as 'aging' the items. In yet another embodiment of the present invention, items that are no longer accessible through the system are removed at this stage from the list of items.

The frequency of this recomputation depends on the appearance of new items in the database, for example, such recomputation can be performed once a day.

Stereotype model reconstruction: as the initial stereotype model is created by an expert and the initial user affinity vectors are manually created through a questionnaire, automatic stereotype discovering phase designed to find new stereotypes automatically and compute new affinity vectors for users, is introduced into the system. This automatic construction (required when a new kind of media items is introduced into the system) ignores the current user model of affinity vectors of stereotypes.

The new stereotypes are created using a clustering process. Cluster-analysis is a process that receives as input a set of objects, which, in the present invention are user profiles, and generates clusters (groups) of similar users, so that the users within a group have high similarity and the users between groups (not belonging to a cluster) are less similar. The number of clusters can be manually predefined or can be automatically induced by the clustering process.

In hard clustering, the objects are divided into crisp clusters, where each object belongs to exactly one cluster. In soft (fuzzy) clustering (see, e.g. [J. C. Bezdek, "*Pattern Recognition with Fuzzy Objective Function Algorithms*", New York, 1981]), the objects belong to more than one cluster, and associate with each of the objects are membership grades, which indicate the degree to which the object belongs to the different clusters. For each cluster, a central stereotype profile, i.e., the centroid, is generated. The centroid is a weighted average of the users' profiles that belongs to the cluster based on their membership grades.

The method proposed by the present invention can employ any suitable clustering processes. Preferably the FCM (Fuzzy C-Means) process is used (e.g. [J. F. Kolen and T. Hutcheson, "Reducing the time complexity of the fuzzy C-Means algorithm", IEEE Transactions on Fuzzy Systems 10(2):263-267, 2002]), mainly due to its efficient implementation that is scalable up to a large number of users. Moreover the FCM uses the probabilistic constraint that the memberships of an object across clusters sum to 1. This constraint is useful for weighting stereotypes.

The computationally heavy update used according to the present invention includes four steps:

User Representation Construction: for each user, a profile similar to the stereotype profiles is constructed. This profile comprises a list of preferred values for each possible attribute in the ontology. This profile is automatically computed by observing the list of media items rated positively. Each value of an attribute of an item is added into the user profile. For example, if the user has positively rated a movie with a particular actor, that particular actor is added to the list of actors preferred by the user. This can be thought of as merging the media items together into a single profile. This profile is used only for the update process, and not for computing recommendations for the user.

Clustering User Profiles: an appropriate clustering process is used to create clusters of similar users using a distance metric over the similarity of user profiles computed in the former step. Preferably, a soft-clustering process is used, resulting in a list of cluster centroids and for each user, its distances from the centroids of clusters.

Stereotype Construction: each cluster is used as a new stereotype. To create the stereotype profile, users that are closer to the cluster centroid more than a predefined threshold are merged. A cluster (stereotype) profile is defined by the attribute values the users close to its centroid have favored. This merging is weighted by the distance of users from the centroid, so that closer users have higher impact.

Affinity Vector Reconstruction: for each user, the new affinity vector is defined as the membership grades to the clusters. In the embodiment where FCM is used, these grades are already computed by the FCM process, thus there is no need for additional computations. Once the affinity vector is reconstructed, the user is no longer referred to the manually generated stereotypes, but rather to the new, automatically generated ones.

In some embodiments of the present invention the manually generated stereotypes are maintained and used to define new users. New users will not have affinity to the automatically generated stereotypes until they will undergo a model reconstruction phase. Alternatively, in other embodiments, a new decision tree can automatically be learned for each new user for the questionnaire from the preferences database by using tree induction processes, such as C4.5 or CART. This is used to create the right order of questions in the questionnaire that each user is required to fill out.

Since the second type of updating is computationally heavy, it is not intended, according to the present invention, to be executed often. It is needed only when much data has been gathered through feedbacks, or when a shift in trends in user preferences is detected.

As would be understood by those familiar in the art, the system proposed by the present invention, as described hereinabove, combines features from various approaches to recommendations. The initial user affinity vector construction is content-based oriented in that the attributes of the contents of the media item (e.g. actors, director and genre) that every specific user prefers are identified. However, usually in CB systems the user profile is extracted from items he has rated, whereas the present invention extracts the user's profile based on an expert input. Construction of user profiles based on an expert input is sometimes called Demographic Filtering (see, e.g. [Montaner et al., 2003]).

The computationally heavy update referred to hereinabove incorporates aspects of content-based (CB) and collaborative filtering (CF). Merging media item attributes to create a user profile of preferred attributes of media elements is considered to be classic CB, while clustering users together is more CF oriented. When creating the stereotypes through clustering, averaging over a number of users is performed, wherein the influence of each user is weighted according to his distance from the centroid of the cluster. Therefore, the resulting recommendations are not based only on items the user has seen and liked, but also on items that similar users have seen and liked, which is a CF approach to recommendations.

In light of the hybrid nature proposed by the present invention, the disadvantages of conventional approaches are solved. The "cold start" problem, described hereinabove, is handled using expert knowledge. The difficulty of having the user properly specify his preferences is simplified through the interactive, any-time, questionnaire implemented according to the present invention. Moreover, even if the profile is inaccurate, it will be refined through the light and heavy updates detailed hereinabove to better reflect the user preferences. The common problem of CB systems that can recommend to the user only items similar to the ones he has seen and liked does not exist when using the present invention, since users also receive recommendations based on data regarding preferences of similar users.

Although embodiments of the present invention have been described by way of illustration, it will be understood that the invention may be carried out with many variations, modifications, and adaptations, without departing from its spirit or exceeding the scope of the claims.

The invention claimed is:

1. A hybrid recommender system for delivering content that fits a user preferences, implementing a process comprising the steps of:
    a. manually defining one or more initial stereotypes by an expert;
    b. creating an affinity vector of stereotypes relating to each specific user who registers onto the system, thereby creating a specific profile for each user, wherein said affinity vector for each user is created according to her response to a set of questions, where each question compares several representative items, and a form, based on a decision tree and specifying said user's interests, and wherein said affinity vector is saved in a database;
    c. generating recommendations for a specific user according to said initial stereotype and said affinity vector of stereotypes, wherein said recommendations are generated using a matching engine that computes the relevance of an item to the user, thereby creating a recommendation list of items to incorporate into the database;
    d. receiving feedback from user regarding specific items picked by him, wherein said feedback can be either positive or negative; and
    e. updating said affinity vector of stereotypes and said recommendation list of items saving them in said database;
    wherein the content delivered to the user contains a predefined number of the most relevant items to her according to said recommendation list.

2. The hybrid recommender system according to claim 1 wherein the user answers between none and all of the questions appearing on the form.

3. The hybrid recommender system according to claim 1 wherein the form is partially filled out according to information available to the system from sources other than the user.

4. The hybrid recommender system according to claim 1 wherein said form is based on a decision tree.

5. The hybrid recommender system according to claim 1 wherein the form is learned by a tree induction process thereby creating a new decision tree for each new user.

6. The hybrid recommender system according to claim 1 wherein the recommendations for a specific user are generated using a matching engine that computes the relevance of each item (i) to said user (u) with affinity vector (v) according to $$\text{relevance }(i, u) = \sum_{s \in stereotypes} v(s) \text{ relevance }(i, s),$$

wherein relevance(i,s) is the relevance of item (i) to stereotype (s).

7. The hybrid recommender system according to claim 1 wherein the recommendation comprises items with unexpected context to the user chosen according to an ε-greedy technique and/or by randomly boosting the relevance of a random stereotype.

8. The hybrid recommender system according to claim 1 wherein the feedback is binary.

9. The hybrid recommender system according to claim 1 wherein the feedback uses explicit ratings, implicit ratings or both implicit and explicit ratings.

10. The hybrid recommender system according to claim 1 wherein the feedback is received from the user during her use of the item.

11. The hybrid recommender system according to claim 1 wherein the feedback is automatically registered by said system according to the user's reaction to the recommended items.

12. The hybrid recommender system according to claim 1 wherein the affinity vectors are updated by a computationally light process, a computationally heavy process, or both said processes.

13. The hybrid recommender system according to claim 12 wherein the affinity vectors are updated by a computationally light process comprising the steps of:
    a. updating the affinity vector according to feedback received from the user;
    b. re-computing the recommendation list of item to incorporate new items added into the database, wherein a new relevance value for each new item (i) is computed to the user (u) with affinity vector (v) according to $$\text{relevance}(i, u) = \sum_{s \in stereotypes} v(s) \text{relevance}(i, s),$$

wherein relevance(i,s) is the relevance of item (i) to stereotype (s), and wherein said new relevance values are merged into the existing recommendation list; and
    c. reconstructing the stereotypes automatically ignoring the affinity vectors of stereotypes using a clustering process according to at least one of the following measures:
        i. said user feedback;
        ii. new items offered;
        iii. new trends among users; and
        iv. revised ontology representation for items.

14. The hybrid recommender system according to claim 13 wherein the number of clusters is either predefined or automatically induced.

15. The hybrid recommender system according to claim 13 wherein the clustering process is a fuzzy C-Means clustering process.

16. The hybrid recommender system according to claim 12 wherein the computationally heavy updating process comprises the steps of:

a. automatically constructing a user representation profile that comprises a list of preferred values for each possible attribute by observing the list of items rated positively;

b. creating clusters of similar users by way of a clustering process using a distance metric over the similarity of said user representation profile;

c. creating a stereotype profile wherein the users are weighted according to said distance metric; and d. reconstructing an affinity vector for each user according to said stereotype profile.

17. The hybrid recommender system according to claim 16 wherein a soft-clustering process is used.

18. The hybrid recommender system according to claim 1 wherein the manually defined initial stereotypes are maintained and used to define new users.

* * * * *